United States Patent [19]

Goeckler

[11] Patent Number: 5,568,206
[45] Date of Patent: Oct. 22, 1996

[54] DEVICE FOR PROCESSING MODULATED RAIL ANALOG TELEVISION SIGNAL

[75] Inventor: Heinz Goeckler, Backnang, Germany

[73] Assignee: ANT Nachrichtentechnik GmbH, Backnang, Germany

[21] Appl. No.: 439,201

[22] Filed: May 11, 1995

[30] Foreign Application Priority Data

May 20, 1994 [DE] Germany .................. 44 17 723.2

[51] Int. Cl.$^6$ ........................................ H04N 5/455
[52] U.S. Cl. .................. 348/726; 348/738; 364/724.1; 455/293
[58] Field of Search .................. 348/737, 738, 348/442, 726, 572, 720, 424, 427; 364/724.1, 731; 375/324, 344, 334, 350; 329/316, 302; 455/293, 337; H04N 5/44, 5/455, 5/60

[56] References Cited

U.S. PATENT DOCUMENTS

| | | | |
|---|---|---|---|
| 4,709,270 | 11/1987 | Mehrgardt | 348/726 |
| 4,866,519 | 9/1989 | Lucas et al. | 348/427 |
| 4,907,082 | 3/1990 | Richards | 348/738 |
| 5,202,766 | 4/1993 | Mehrgardt et al. | 348/738 |
| 5,226,057 | 7/1993 | Boren | 375/350 |
| 5,357,544 | 10/1994 | Horner et al. | 364/724.1 |

FOREIGN PATENT DOCUMENTS

| | | | |
|---|---|---|---|
| 0062872 | 10/1982 | European Pat. Off. | H04B 1/30 |
| 0321681 | 6/1989 | European Pat. Off. | H04N 5/44 |
| 3305918 | 9/1983 | Germany | H04B 1/66 |
| 3621737 | 1/1988 | Germany | H03H 17/06 |
| 3743727 | 7/1989 | Germany | H04N 5/44 |
| 4004631 | 8/1991 | Germany | H04N 5/44 |
| 4241965 | 5/1994 | Germany | H03D 3/00 |
| 4305075 | 7/1994 | Germany | H03H 17/02 |

OTHER PUBLICATIONS

Signal Processing 9, 1985, Kammeyer, K. D., pp. 263–276.
Multirate Digital Signal Processing, Crochiere et al, 1983, pp. 1–35.
Empfangskonzept fuer einen digitalen Empfaenger, Fink, et al, ntzArchiv, vol. 5, 1983, H 12, pp. 353–358.
IEEE, 1993, Erhardt and Benkner "Digital TV Receiver with a Low IF", pp. 331–339.
International Conference on Digital Satellite Communications, Copenhagen, 1992, pp. B247–B254.
IEEE Transactions on Communications, vol. 37, No. 2, 1989, "A New pattern jitter free frequency error detector", Thomas Alberty, et al, pp. 159–163.

Primary Examiner—Safet Metjahic
Assistant Examiner—Jeffrey S. Murrell
Attorney, Agent, or Firm—Michael J. Striker

[57] ABSTRACT

A device for processing a modulated real analog television signal has a digital preprocessing stage for conditioning a complex digital signal for digital demodulation of a television signal at intermediate frequency. The digital signal preprocessing is carried out such that subsequent demodulation of the video and audio elements can be carried out at a favorable cost. Therefore a fully-digital signal processing for television signals, from the intermediate frequency, with a limited filter cost is possible.

34 Claims, 8 Drawing Sheets

DEVICE FOR PROCESSING MODULATED RAIL ANALOG TELEVISION SIGNAL

BACKGROUND OF THE INVENTION

The invention relates to a device for processing a modulated real analog television signal which is at intermediate frequency.

From DE 33 05 918 C2, it is known for a television signal at intermediate frequency to be sampled by means of an A/D converter, and for the further processing, in particular the demodulation, to be carried out digitally. The frequency of the sampling signal is in this case less than twice the carrier frequency.

EP 62 872 B1 discloses the signal processing of a sampled intermediate-frequency signal as a complex digital signal.

The older patent application P 43 37 134 discloses a method for conditioning a digital frequency-multiplexed signal from television channel signals. The channel signals are oversampled, filtered by means of a complex half-band filter, and shifted in frequency by means of a complex mixer for further processing. Decimation by the factor 1/2 is also carried out by means of this complex half-band filter.

SUMMARY OF THE INVENTION

The object of the present invention is to design the device such that digital demodulation of the television signals is possible at low cost.

In keeping with these objects and with others which will become apparent hereinafter, one feature of the present invention resides, briefly stated, in a device for processing a modulated analog television signal at intermediate frequency, which has a sampling unit for closed sampling of a television signal at intermediate frequency having an oversampling factor of at least 2, related to a useful bandwidth of the television signal at the intermediate frequency, a digital filter for converting the oversampled signal into a complex digital signal, a mixing device for frequency shifting the complex digital signal in such a manner that a mid-frequency of the complex digital signal appears at a frequency 0, a digital filter for band limiting the complex, frequency-shifted digital signal to form a complex output signal, said digital filter having real coefficients for the separate handling of a real part and of an imaginary part of the complex, frequency-shifted digital signal, and digital demodulators for processing of the video and audio elements of the complex output signal after previous mixing.

In accordance with another modification the device for processing a modulated real analog television signal at intermediate frequency has a sampling unit for closed sampling of the television signal at intermediate frequency having an oversampling factor of at least 2, related to the useful bandwidth of the television signal at the intermediate frequency, a digital filter having real coefficients for band limiting of the real television signal, a digital filter for converting the oversampled real signal into a complex output signal, digital demodulators for joint or separate processing of the video and audio elements of the complex output signal after previous, suitable mixing.

In accordance with still a further modification of the invention, the device for processing a modulated real analog television signal at intermediate frequency has a sampling unit for closed sampling of the television signal at intermediate frequency having an oversampling factor of at least 2, related to the useful bandwidth of the television signal at the intermediate frequency, a digital filter for converting the oversampled real signal into a complex digital signal, a digital filter for band limiting the complex digital signal to form a complex output signal, this digital filter having complex coefficients, digital demodulators for joint or separate processing of the video and audio elements of the complex output signal after previous, suitable mixing.

The device according to the invention allows complete, uniform digital implementation of a video and audio demodulator for television signals. The joint preprocessing to form a complex output signal allows flexible further processing. Thus, video and audio elements can be processed largely jointly at low cost, or separately in order to keep interference or filter tolerances low.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
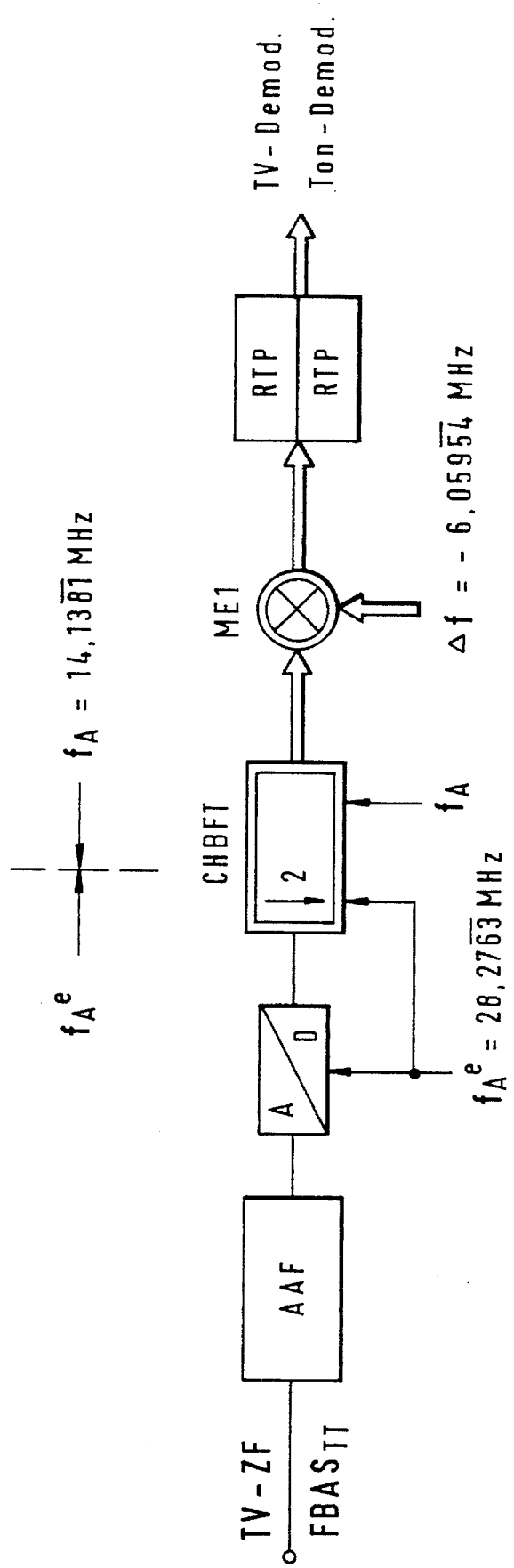
FIG. 1 shows a block diagram for digital preprocessing stage with a first embodiment for the video and audio demodulation.
Figures 4A, 4B:
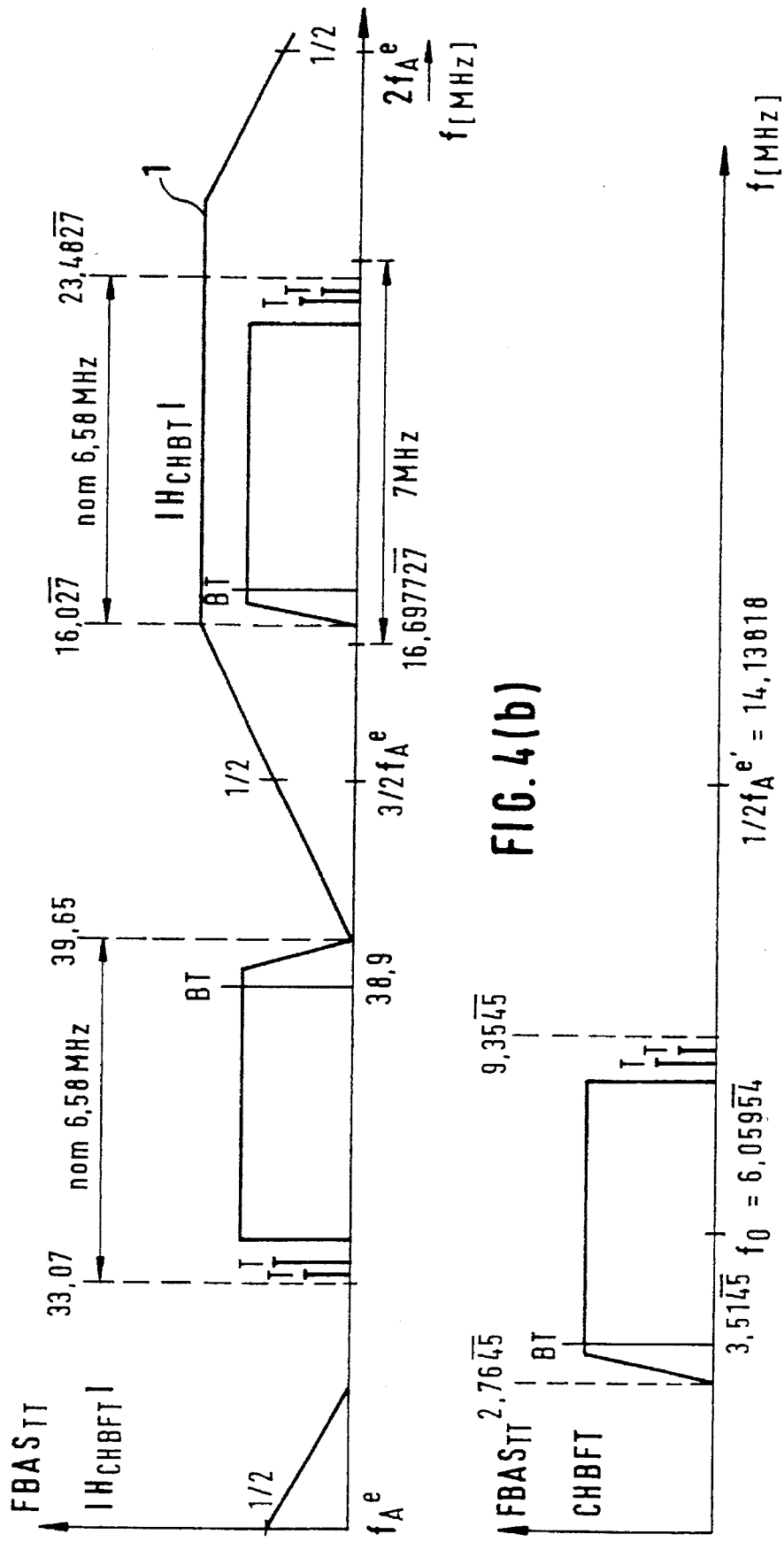
FIG. 4 shows the signal spectrum of the television signal before and after sampling.

The block diagram according to FIG. 1 shows one possible embodiment of the signal preprocessing for the subsequent video and audio demodulation devices, comprising, for example, the demodulator DMF for the video elements with an upstream mixer FUTV, and the demodulators DMT1 and DMT2 for the separate processing of the audio elements, with correspondingly upstream mixers FUT1 and FUT2. The input signal for the signal preprocessing according to FIG. 1 is an analog television signal $FBAS_{TT}$ which is at intermediate frequency—with a video sub-carrier preferably of 38.9 MHz (CCIR Standard). The $FBAS_{TT}$ signal is sampled in a closed manner by means of a sampling unit—A/D converter. The sampling frequency is preferably $f_A^e=$ 28.2763 MHz FIG. 4 shows the television signal before and after sampling (a) and after filtering and decimation (b). The sampled television signal is converted by means of a digital preprocessing stage VV into a complex digital signal, and is spectrally shifted such that the mid-frequency of the complex digital signal appears at the frequency 0 (FIG. 1a). For clarification, where the digital signal is present in complex form, the corresponding signal paths and assemblies are designated by double lines in the Figures.

The sampling at $f_A^e=28.2763$ MHz is preconditional on adequate band limiting being achieved by means of an upstream analog IF filter. If no such IF filter is provided, an antialiasing filter AAF should be connected upstream, which limits the television signal with the useful bandwidth B such that no spectral overlaps or convolutions with the useful spectrum or its image frequencies is produced by sampling at a sampling rate $f_A^e>2B$ After the analog/digital conversion A/D, the television signal is oversampled at $f_A^e$ in order then to be filtered and decimated subsequently using a complex digital filter CHBFT by sampling at $f_A=f_A^{e/2}=14.1381$ MHz.

The complex digital filter CHBFT extracts the signal spectrum in the normal position as is required for the subsequent TV demodulation. If necessary, the further processing can, of course, also be carried out in the inverse position.

The complex digital filter CHBFT is preferably designed as an L-band filter (complex Nyquist filter), L being an integer decimation factor. In the case of a complex Nyquist filter, the central coefficient for the most advantageous case in complexity terms is real 1/L or purely imaginary j/L. The central coefficient becomes 1/2 or j/2, respectively, (half-band filter), using a decimation factor of L=2, which reverses the previous oversampling by the sampling unit A/D by the factor 2 again.

The assemblies of the preprocessing stage according to FIG. 1 corresponds partially to the implementation according to P 43 37 134. The principle of the complex half-band filter CHBFT is described, per se, in German Patent 36 21 737. The magnitude of the transfer function of the complex half-band filter $|H_{CHBFT}|$ is illustrated in FIG. 4, together with the sampling frequencies $f_A^e$ or $f_A$ and the band limits. The respective frequency of the video sub-carrier is designated by BT, and the frequency of the audio sub-carrier by TT. For the frequency sifting of the complex digital signal in such a manner that the mid-frequency of the complex digital signal appears at the frequency 0 or $f_{BT}=-2.545$ MHz, a complex mixing device ME1, to which a mixing frequency of $f_0=6.05954$ MHz is supplied, is provided, as in the case of the implementation according to P 43 37 134, at the output of the complex half-band filter CHBFT. The output signal of the complex mixing device ME1 is supplied to a pair of identical low-pass filters RTP having real coefficients, which can be implemented recursively or non-recursively. One low-pass filter is provided for the real part and the other for the imaginary part of the complex signal to be processed. Such a pair of filters having real coefficients— there is thus no coupling over from the real part to the imaginary part or vice versa—can therefore be used for filtering of the complex signal since the mid-frequency of the spectrum of the complex (time) signal is f=0. These low-pass filters can be implemented at low cost as a linear-phase FIR filters. An adjacent channel selection of $a_s=75$ dB can be achieved using a filtering level of N=105 for the RTP pair of filters.

Figure 1B:
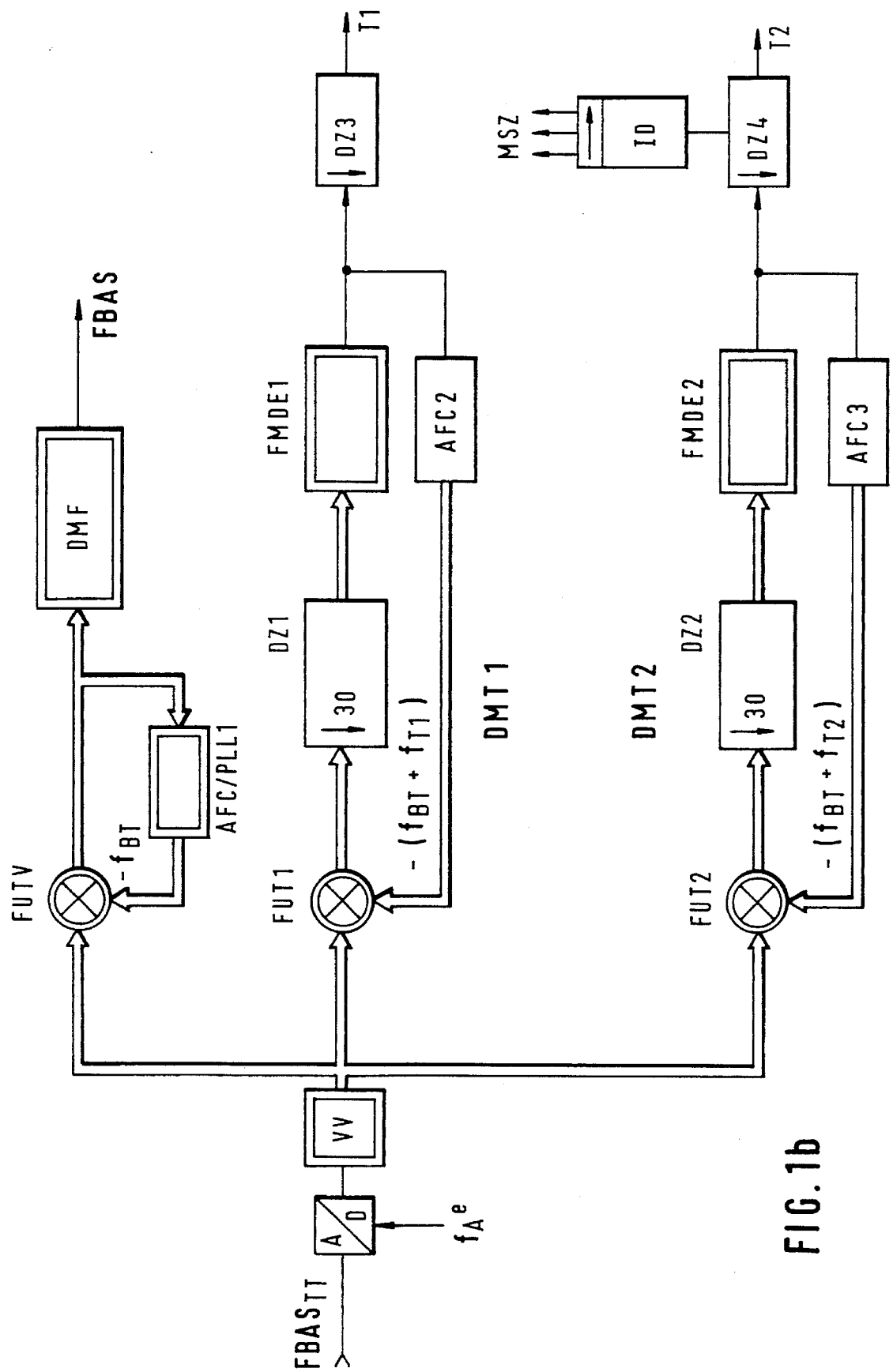

The output signal of the preprocessing stage VV is now further processed in a first implementation in three paths—if two audio sub-carriers are provided—to be precise in a first path for the video demodulation and in two further paths for the two audio signals T1 and T2 (FIG. 1b). The third path is, of course, omitted if there is only one audio sub-carrier to be processed. Provided in the first path is a first complex mixing device FUTV, whose mixing frequency is selected such that the video sub-carrier $f_{BT}$ appears at the frequency 0 after mixing. The complex mixing device is followed by a complex digital demodulator DMF for the video element of the television signal, by means of which the composite video signal is extracted, sampled, for example, at 14.13818 MHz. The complex mixing device FUTV is equipped with a frequency control loop and/or phase locked loop AFC/ PLL1, which makes it possible for the video sub-carrier BT to be exactly at the frequency 0 and to have the correct phase (locked-in state).

Provided in the second path is a digital demodulator DMT1 for the processing of the first audio sub-carrier T1, which demodulator DMT1, supplied from the preprocessing stage VV, firstly has a complex mixing device FUT1 for the processing of the audio sub-carriers T1. The complex carrier oscillation of the mixing device FUT1 is derived via the frequency and/or phase locked loop AFC2.

The digital demodulator DMT2, with the mixing device FUT2 on the input side, is located in the third path, which is designed in the same way as the second path but is used for processing the audio sub-carrier T2. The complex carrier oscillation for this mixing device FUT2 is derived via the frequency and/or phase locked loop AFC3.

As a result of the selection of the mixing frequencies $-(f_{BT}+f_{T1})$ and $-(f_{BT}+f_{T2}]$, the mixing of the audio sub-carriers after mixing in each case being f=0. Since an FM spectrum represents a double side-band signal, the decimation filter devices DZ1 and DZ2 which are connected downstream of the mixing devices FUT1 and FUT2 have real coefficients.

The decimation filter devices DZ1 and DZ2 are of identical design and carry out a sampling rate reduction with Q=1/M, M as a rule being a natural number, for example 30, that is to say the sampling rate is reduced from 14.3818 MHz to 471.27 kHz. Such decimation filter devices are described, for example, in Multirate Digital Signal Processing by R. E. Crochiere and L. R. Rabiner, Prentice-Hall Inc., Englewood Cliffs, N.J. USA. Recursive or non-recursive FIR filters are possible, which can be implemented efficiently as polyphase filters. The decimation is preferably carried out in three stages, using the decimation factors 5, 3 and 2. The output signals of the decimation filter devices DZ1 and DZ2 are passed on to in each case one complex audio-FM demodulator FMDE1 or FMDE2 respectively for in each case one of the audio signals T1, T2. Such complex audio-FM demodulators having complex input signals and real output signals are known per se (Signal Processing 9, 1985, North Holland, pages 263–276 "Equalization Problems in a Digital FM Receiver"; DE 42 41 965.4) and thus do not need to be explained in more detail. The frequency control loops AFC2 and AFC3 may be of Grade 1. Alternatively, a combined frequency control loop and phase locked loop can also be provided. The frequency control loops AFC2 and AFC3 can be implemented using a frequency error detector, for example in accordance with IEEE Transactions on Communications, Vol. 37, No. 2, 1989, pages 159–163. The frequency control loops AFC2 and AFC3 process the output signals of at of the two FM demodulators FMDE1 and FMDE2 respectively to form two complex carrier oscillations at the frequency $-(f_{BT}+f_{T2})$ or $-f_{BT}+f_{T2})$, respectively. The video sub-carrier $f_{BT}$, which the control loops AFC2 and AFC3 require as reference frequency, can be derived from the output signal of the mixing device FUTV or from a signal in its control loop AFC/PLL1, or is permanently set as a nominal initial value in the control loops AFC2 and AFC3. the latter also applied to the nominal values of the audio sub-carrier frequencies $f_{T1}$ and $f_{T2}$. Only one decimation, by the decimation factor 22/81, is in each case still required to obtain digital audio signals at standardized sampling frequencies, for example 32 kHz. The decimation filter devices DZ3 and DZ4 are provided for this purpose, which preferably first decimate by the factor 2 and subsequently by the factor 11/81.

Figure 2A:
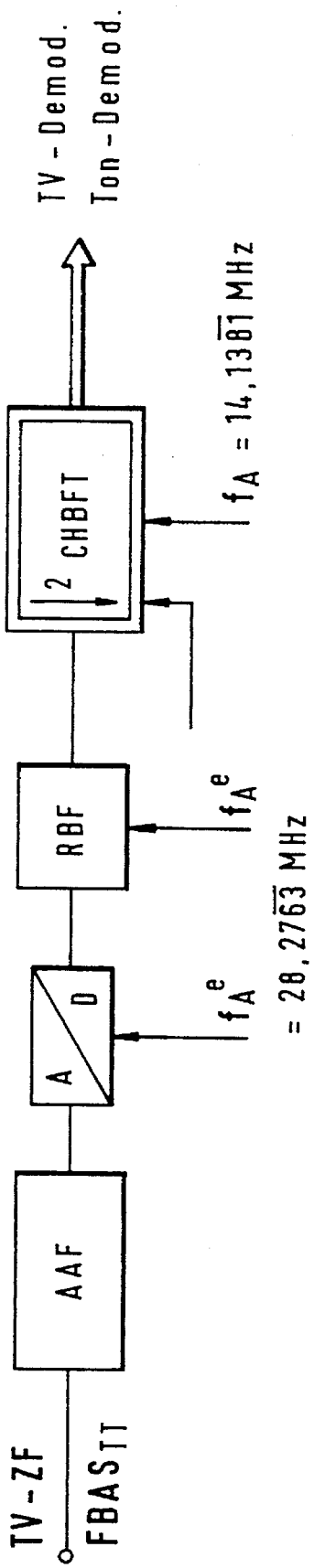
FIG. 2 shows an alternative for the digital preprocessing stage, with a second embodiment of the video and audio demodulation.
Figure 2B:
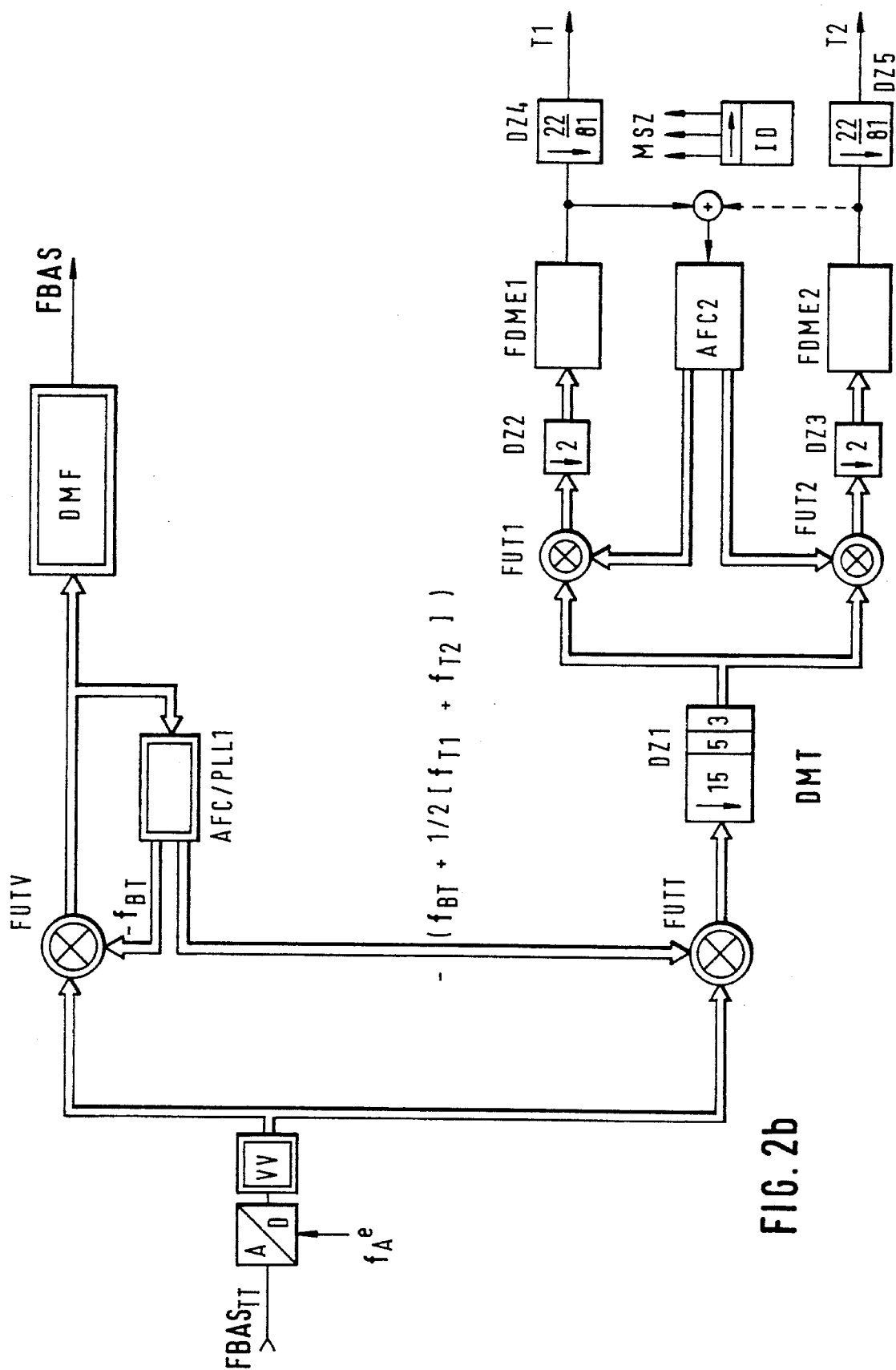

An alternative both for the preprocessing stage VV (FIG. 2a) and for the subsequent video and audio demodulation (FIG. 2b) is shown in FIG. 2. The refinement of the preprocessing stage according to FIG. 1a can, of course, be combined with the refinement of the video and audio demodulation according to FIG. 2b. In contrast to FIG. 1a, a digital filter RBF in the form of a general (that is to say non-recursive or recursive) FIR or IIR band-pass filter is located at the output of the A/D converter, operates at the sampling rate $f_A$ and is used for band limiting of the sample real television signal. It has real coefficients $N_{RBF}$, so that the multiplication rate $M_{RBF}=N_{RBF} \times f_A$ is produced. The downstream digital filter CHBFT operates at the same sampling rate $f_A$. It is designed as a complex half-band filter in order to convert the oversampled real television signal into a complex output signal. The filter CHBFT is designed such that it carries out a sampling rate conversion by the factor 1/2, that is to say the oversampling by the factor 2 of the A/D converter is reversed again. Some coefficients in this complex half-band filter CHBFT are identical to 0. A filtering level of N=127 results, for example, for the digital filter RBF, which is to be designed with very steep edges, and a filtering level of N=27 for the filter CHBFT. The filter CHBFT is designed such that it carriers out a sampling rate conversion by the factor 1/2, that is to say the oversampling by the factor 2 of the A/D converter is reversed again. The CHBFT filters of FIG. 1a and FIG. 2a are thus identical.

In contrast to the implementation according to FIG. 1b, the output signal of the filter CHBFT is now jointly further processed with respect to the two or more audio elements (two audio sub-carriers TT are assumed in the exemplary embodiment). The path for the video demodulation is designed as in FIG. 1b, with the difference that the frequency control loop and/or phase locked loop has a second output to provide the mixing frequency of the complex mixing device FUTT at the output of the demodulator DMT for joint processing of the audio elements. The complex carrier oscillation for the mixing device FUTT is thus derived from the carrier oscillation of the mixing device FUTV. In the exemplary embodiment illustrated in FIG. 2b, the frequency control loop and/or phase locked loop AFC/PLL1 is designed such that the video sub-carrier frequency $f_{BT}$ for the mixing device FUTV appears at its first output, and the video sub-carrier frequency $f_{BT}+1/2 [f1_{T1}+f_{T2}]$ appears at its second output, being offset by the arithmetic mean of the two audio sub-carrier frequencies $f_{T1}$ and $f_{T2}$. Alternatively, separate control loops AFC3 and AFC3 can be used, as before, whose nominal initial value is set permanently.

Figure 3A:
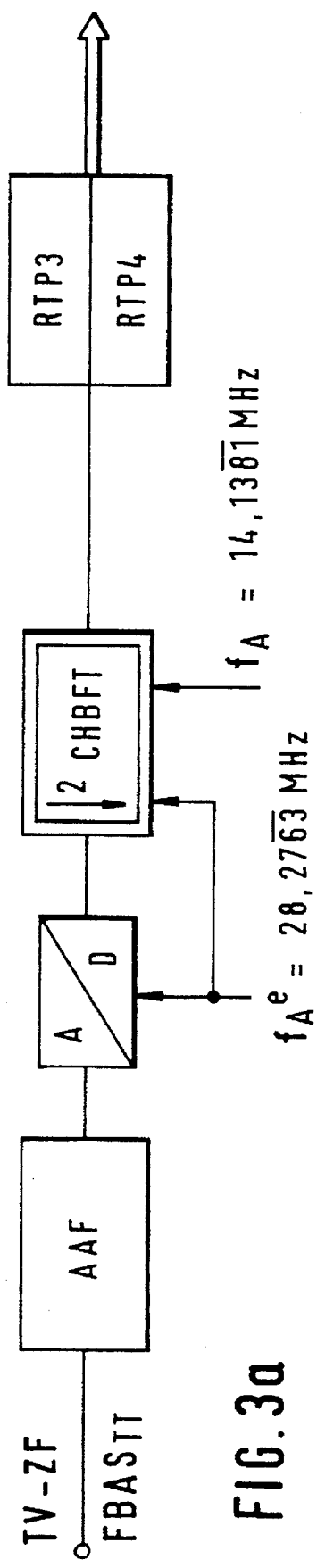
FIG. 3 shows a further alternative for the digital preprocessing stage, with a third embodiment for the video and audio demodulation.
Figure 3B:
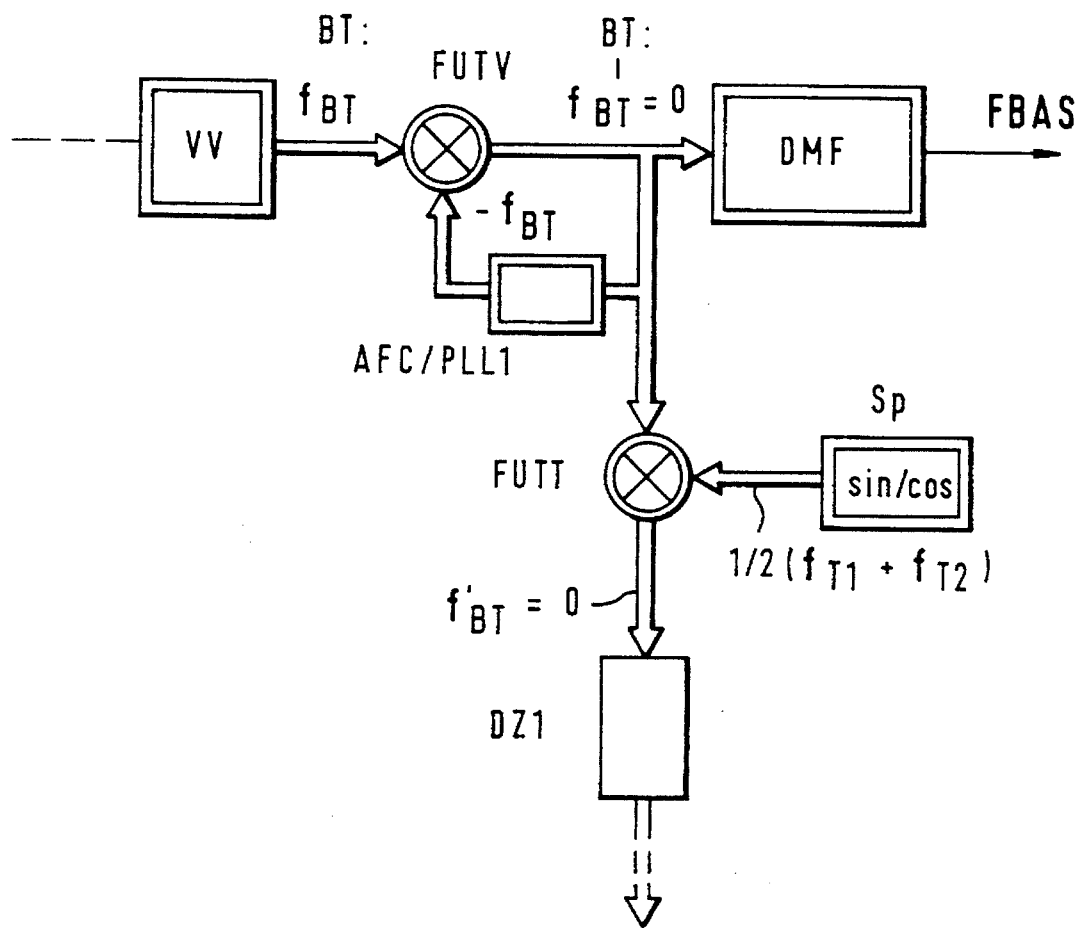

In a further alternative solution, illustrated in FIG. 3b, the complex carrier oscillation $(f_{BT}+1/2[f_{T1}+f_{T2}]$ for the mixing device FUTT is not derived via the frequency control loop and/or phase locked loop AFC/PLL1, but the output signal of the mixing device FUTV is mixed, with the addition of the complex carrier, with the frequency of the arithmetic mean $1/2 (f_{T1}+f_{T2})$ of the nominal audio sub-carrier frequencies $f_{T1}$ and $f_{T2}$, so that, in the output signal of FUTT, one audio sub-carrier is at $-1/2 (f_{T1}+f_{T2})$ and the other audio sub-carrier is at $1/2 (f_{T1}+f_{T2})$. The complex composite video FBASTT signal, separated by means of FUTV, can be used directly as the input signal for FUTT (new frequency of the video sub-carrier $f'_{BT}=0$), or the real or imaginary part of this signal. In the case mentioned last, a complex TT signal can be derived once again, at the frequency stated above, either with the aid of one of the described CHBF filters (L band) with downstream frequency conversion, or using the Weaver method.

This complex carrier oscillation (mixer frequency: $-1/2 (f_{T1}+f_{T2})$) can be produced by conversion of a real carrier oscillation—for example by means of CHBF filters or the Weaver method—into the complex domain. In the simplest case, a memory device Sp with a sin/cos table is used for this purpose. The memory device can be designed either as a standard ROM chip or as a standard RAM chip, the samplings of the sin/cos values being stored either permanently or variably.

The output of the mixing device FUTT (FIG. 2b or FIG. 3b) passes to a decimation filter device DZ1, which carries out a sampling rate conversion with Q=1/M, M being a rule being a natural number, for example 15, that is to say from 14.1381 MHz to 942.54 kHz. This decimation filter device can be designed analogously to the decimation filter device according to German Patent 36 21 737. As already mentioned, such decimation filter devices are described generally in Multirate Digital Signal Processing by R. E. Crochiere and L. R. Rabiner, Prentice-Hall Inc., Englewood Cliffs, N.J. USA. Recursive or non-recursive FIR filters are possible, which can be implemented efficiently as polyphase filters. The decimation is preferably carried out in two stages using the decimation factors 5 and 3. The output signal of the decimation filter device DZ1 is supplied in each case separately, in parallel paths, for the two audio signals T1 and T2 to a third and fourth complex mixing device FUT1 and FUT2, respectively. One decimation filter device DZ2 or DZ3 respectively, for sampling rate conversion by the factor 2, that is to say to 471.27 kHz, is in each case connected downstream of the two mixing devices FUT1 and FUT2. Said decimation filter devices are followed by in each case one complex audio-FM demodulator FMDE1 or FMDE2 respectively, for in each case one of the audio signals T1, T2.

Such complex audio-FM demodulators having complex input signals and real output signals are known per se, as indicated already (Signal Processing 9, 1985, North Holland, pages 263–276 "Equalization Problems in a Digital FM Receiver"; DE 42 41 965.4) and thus do not need to be explained in more detail. In order to derive the mixing frequencies at the correct frequency for the third and fourth mixing devices FUT1 and FUT2 respectively, at least one frequency control loop AFC2 of at least first order is provided. Alternatively, a combined frequency control loop and phase locked loop can also be provided. The frequency control loop AFC can be implemented using a frequency error detector in accordance with IEEE Transactions on Communications, Vol. 37, No. 2, 1989, pages 159–163. The frequency control loop AFC2 processes the output signal of at of the two FM demodulators FMDE1 and FMDE2 respectively to form two complex carrier oscillations at the frequency $+1/2 (f_{T2}+f_{T1})$ or $-1/2 (f_{T2}+f_{T1})$, respectively, each of which results from the differences between the two audio sub-carrier frequencies, but whose mathematical signs are different. Sin/cos tables are used once again in the frequency control loop in order to produce complex carrier oscillations from the real output signal or signals. The complexity is less than separate audio processing in accordance with the refinement according to FIG. 1. Only one decimation filter is necessary for decimation by the factor 15. Only one AFC loop is likewise necessary for the demodulation of the two audio sub-carriers T1 and T2, which loop additionally still manages with one sin/cos table. (The frequency and thus the phase differ only by mathematical sign). Furthermore, the AFC loop has a shorter loop delay. Only one decimation, by the decimation factor 22/81, is in each case still required to obtain digital audio signals at standardized sampling frequencies, for example 32 kHz. The decimation filter devices DZ4 and DZ5 are provided for this purpose, which preferably first decimate by the factor 2 and subsequently by the factor 11/81.

Figure 5:
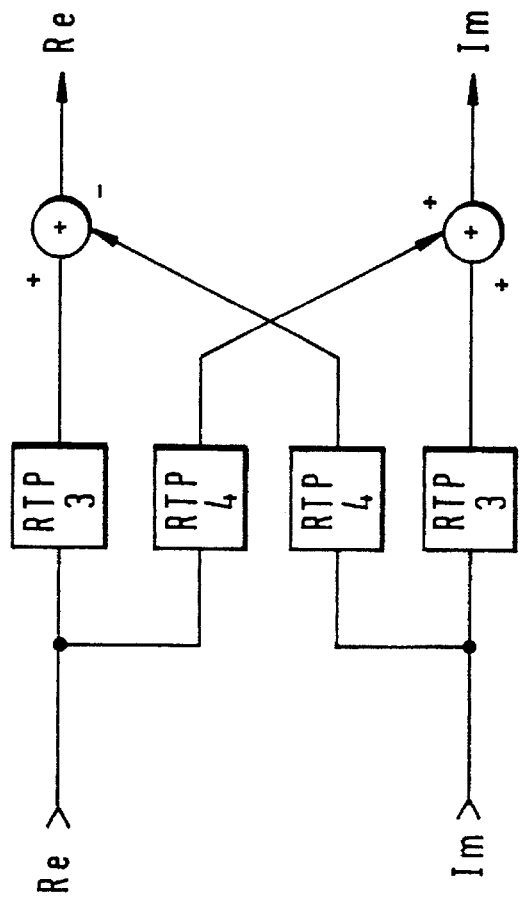
FIG. 5 shows a block diagram of a filter structure.

In the same way as the exemplary embodiment in FIG. 1a, the preprocessing stage VV according to FIG. 3a has a complex digital filter CHBFT downstream of the A/D converter, which digital filter is preferably likewise designed as an L-band filter with a decimation factor of 2. In contrast to FIG. 1, the mixing device ME1 is omitted, and the pair of digital filters RTP3/RTP4 for band limiting of the complex digital signal now have complex coefficients. FIG. 5 illustrates a block diagram of this pair of filters. Said pair of filters consist of four filter elements, of which in each case two are identical. As FIG. 5 shows, in each case two identically designed filter elements for the real part and imaginary part of the complex coefficients (RTP3, RTP4) are linked to one another on the output side, to be precise in such a manner that one pair of filters supplies the real part and the other pair of filters the imaginary part of the output signal of the preprocessing stage VV, the respective pair of filters in each case being supplied with the complex digital signal.

Each of the variants of the preprocessing stage illustrated in FIGS. 1 to 3 can, of course, be combined with any variant for further processing—separate or joint audio signal processing with different conditioning of the mixing frequency of the mixer or mixers FUT1, FUT2 and FUTT.

Figure 6:
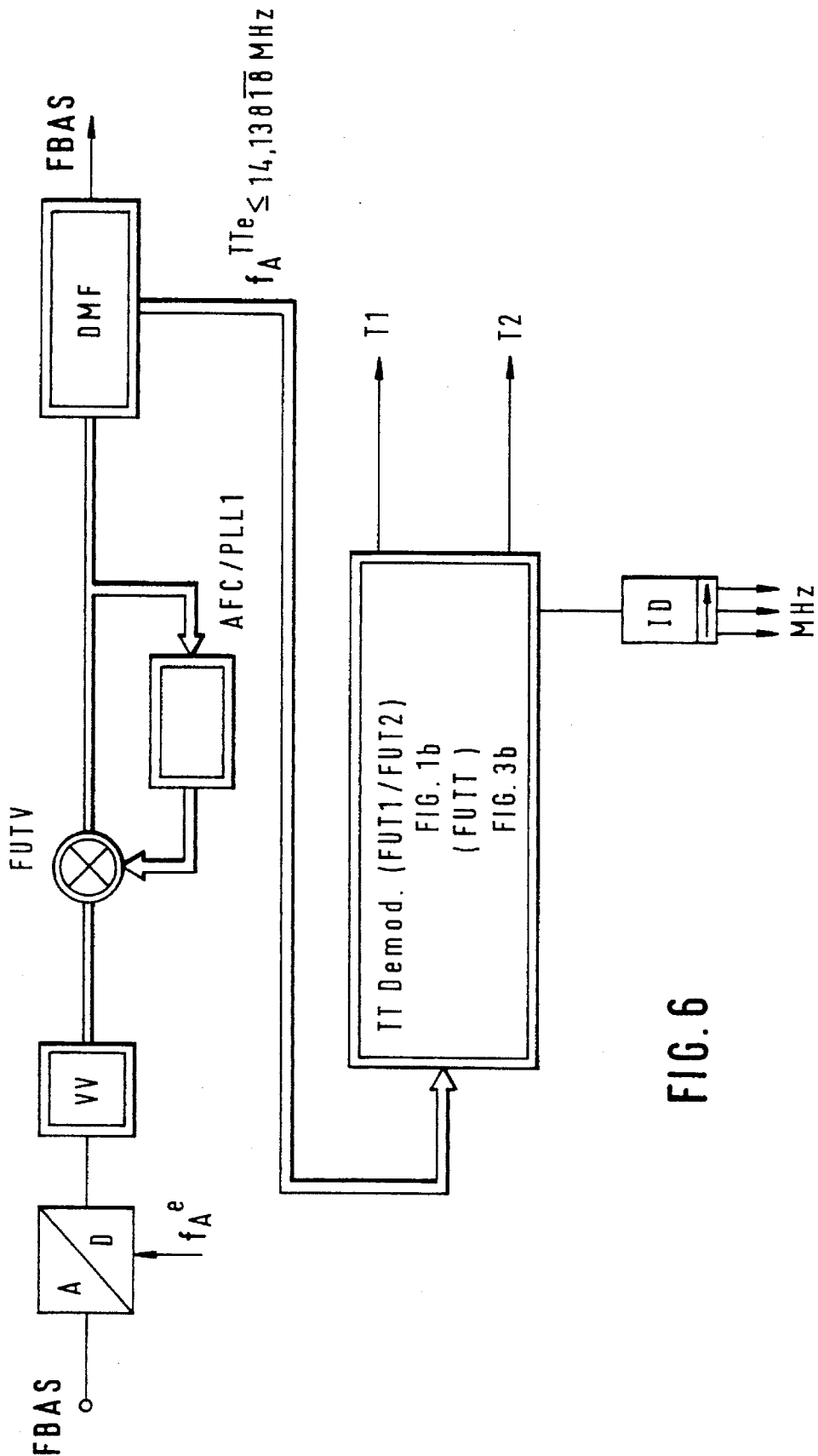
FIG. 6 shows a further embodiment for the video and audio demodulation.

A further variant which is likewise possible to the demodulation of the video and audio elements is shown in FIG. 6. The digital demodulator DMF for processing the video elements ha an additional output for extraction of the audio elements and for passing on to the demodulator or demodulators DMT, or DMT1 and DMT2. The audio elements can be extracted from the demodulator DMF in real or complex form. In the first case, they must be converted once again, at ≈14 MHz, or even decimated. The versions according to FIG. 1b or FIG. 3b are particularly suitable as audio demodulators, it being possible for part or all the decimation by the factor 15 in the audio signal processing path to be omitted (depending on the transfer sampling frequency of the demodulator DMF for the video elements).

The demodulator for the video elements is more complex than the previously introduced exemplary embodiments, since the audio sub-carriers TT not only have to be suppressed, but also have to be transferred without interference. However, in an analogous manner to the inter-carrier method, this version offers a maximum amount of common signal processing.

A device ID, which is preferably connected to one of the further or additional decimation filter devices DZ2, DZ3 DZ4, DZ5 is provided for extraction of any audio identification signals MSZ which may be provided (mono, stereo, two-channel or multiple channel). A particularly advantageous implementation of the ID device with little complexity is that described in the application BK 93/96 of the applicant.

The solution according to the International Conference on Digital Satellite Communications, Copenhagen, May 1992, pages B247–B254 can be used in principle for the frequency control loop and/or phase locked loop AFC/PLL1. However, the use of the solution indicated in the application BK 93/88 of the applicant is particularly advantageous.

A known solution, for example according to DE 33 05 918 C2, is suitable as the demodulator DMF for the video element.

A particularly advantageous demodulator for the processing of the video element is described in the application BK 93/26 of the applicant.

The invention allows all the filter to be designed as FIR filters with linear phase. A universal filter chip can thus be used for all the various filter functions (DE 43 05 075.1).

It will be understood that each of the elements described above, or two or more together, may also find a useful application in other types of constructions differing from the types described above.

While the invention has been illustrated and described as embodied in a device for processing modulated real analog television signal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for processing a modulated analog television signal at intermediate frequency, comprising:

a sampling unit for sampling of a television signal at intermediate frequency having an oversampling factor of at least 2, related to a useful bandwidth of the television signal at the intermediate frequency;

a digital filter for converting the oversampled signal into a complex digital signal;

a mixing device for frequency shifting the complex digital signal in such a manner that a mid-frequency of the complex digital signal appears at a frequency 0;

a digital filter for band limiting the complex, frequency-shifted digital signal to form a complex output signal, said digital filter having real coefficients for a separate handling of a real part and of an imaginary part of the complex, frequency-shifted digital signal; and digital demodulators for processing of video and audio elements of the complex output signal with using one of a joint processing and a separate processing after previous mixing in said mixing device.

2. A device as defined in claim 1, wherein said digital filter for converting has a decimation device with a decimation factor which corresponds to the oversampling factor of said sampling unit, for conversion of the oversampled real television signal into the complex digital signal.

3. A device as defined in claim 1, wherein said digital filter for converting has a complex L-band filter for conversion of the oversampled real television signal into the complex digital signal, wherein L designates an integer decimation factor.

4. A device as defined in claim 1, wherein said digital filter for band limiting the complex digital signal has a pair of filters having identically designed filter elements for the real part and the imaginary part of the complex digital signal.

5. A device as defined in claim 1, wherein said digital filter for band limiting the complex digital signal has four filter elements for the real part and the imaginary part of the complex coefficients, two of said filter elements being identical, said filter elements being linked to one another on an output side so that one pair of said filters supplies the real part and other pair of said filters supplies the imaginary part of an output signal of a preprocessing stage so as to apply the complex digital signal to a respective pair of said filters.

6. A device as defined in claim 1, wherein said sampling unit has a sampling frequency of substantially 4/5 of a mid frequency of the television signal at intermediate frequency.

7. A device as defined in claim 6, wherein the sampling frequency of said sampling unit is 28.2763 MHz.

8. A device as defined in claim 1, comprising a plurality of said digital filters having filter elements, said digital filters and said filter elements having linear phase transverse filters with symmetrical coefficients selected from the group consisting of recursive filters and non-recursive filters.

9. A device as defined in claim 1, wherein said digital demodulators include a digital demodulator for processing of the video elements of the complex digital signal with a mixing frequency selected such that a video sub-carrier appears at a frequency 0 after mixing; and further comprising a complex mixing device connected upstream of said digital demodulator for processing of the video elements of the complex digital signal.

10. A device as defined in claim 9, wherein said digital demodulators include demodulators provided for the separate processing of the audio elements of the complex digital signal and having a complex mixing device connected upstream, said demodulators for the separate processing of the audio elements having mixing frequency selected such that audio sub-carrier frequencies which are offset by the video sub-carrier frequency appear at a frequency 0 after mixing.

11. A device as defined in claim 9, wherein said digital demodulators include a demodulator for the audio elements, said digital demodulator for processing the video elements having an output for extraction of the audio elements and for passing the extracted audio elements to said demodulator for the audio elements.

12. A device as defined in claim 1, wherein said digital demodulators have a demodulator for the joint processing of the audio elements of the complex digital signal, said demodulator for the joint processing of the audio elements of the complex digital signal having a complex mixing device connected upstream and provided with a mixing frequency which is selected such that an original video sub-carrier frequency which is offset by an arithmetic mean of the audio sub-carrier frequencies appear at a frequency 0 at a signal output of said complex mixing device.

13. A device as defined in claim 1, wherein said sampling unit has a sampling frequency of substantially 4/5 of a mid frequency of the television signal at intermediate frequency.

14. A device as defined in claim 13, wherein the sampling frequency of said sampling unit is 28.2763 MHz.

15. A device for processing a modulated analog television signal at intermediate frequency, comprising a sampling unit for sampling of a television signal at intermediate frequency and having an oversampling factor of at least 2 related to a useful bandwidth of the television signal at the intermediate frequency; a digital filter having coefficients for band limiting of the real television signal; a digital filter for converting the oversampled signal into a complex output signal; and digital demodulators for processing of video and audio elements of the complex output signal with using one of a joint processing and a separate processing after previous mixing.

16. A device as defined in claim 15, wherein said digital filter for converting has a decimation device with a decimation factor which corresponds to the oversampling factor of said sampling unit, for conversion of the oversampled real television signal into the complex digital signal.

17. A device as defined in claim 15, wherein said digital filter for converting has a complex L-band filter for conversion of the oversampled real television signal into the complex digital signal, wherein L designates an integer decimation factor.

18. A device as defined in claim 15, comprising a plurality of said digital filters having filter elements, said digital filters and said filter elements having linear phase transverse filters with symmetrical coefficients selected from the group consisting of recursive filters and non-recursive filters.

19. A device as defined in claim 18, wherein said digital demodulators include a demodulator for the audio elements, said digital demodulator for processing the video elements having an output for extraction of the audio elements and for passing the extracted audio elements to said demodulator for the audio elements.

20. A device as defined in claim 15, wherein said digital demodulators include a digital demodulator for processing of the video elements of the complex digital signal with a mixing frequency selected such that a video sub-carrier appears at a frequency 0 after mixing; and further comprising a complex mixing device connected upstream of said digital demodulator for processing of the video elements of the complex digital signal.

21. A device as defined in claim 20, wherein said digital demodulators include demodulators provided for the separate processing of the audio elements of the complex digital signal and having a complex mixing device connected upstream, said demodulators for the separate processing of the audio elements having mixing frequency selected such that audio sub-carrier frequencies which are offset by the video sub-carrier frequency appear at a frequency 0 after mixing.

22. A device as defined in claim 15, wherein said digital demodulators have a demodulator for the joint processing of the audio elements of the complex digital signal, said demodulator for the joint processing of the audio elements of the complex digital signal having a complex mixing device connected upstream and provided with a mixing frequency which is selected such that an original video sub-carrier frequency which is offset by an arithmetic mean of the audio sub-carrier frequencies appear at a frequency 0 at a signal output of said complex mixing device.

23. A device for processing a modulated analog television signal at intermediate frequency, comprising a sampling unit for sampling of a television signal at intermediate frequency having an oversampling factor of at least 2 related to a useful bandwidth of the television signal at the intermediate frequency; a digital filter for converting the sampled signal into a complex digital signal; a digital filter for band limiting the complex digital signal to form a complex output signal, said digital filter having complex coefficients; and digital demodulators for processing of video and audio elements of the complex output signal with using one of a joint processing and a separate processing after previous mixing.

24. A device as defined in claim 23, wherein said digital filter for converting has a decimation device with a decimation factor which corresponds to the oversampling factor of said sampling unit, for conversion of the oversampled real television signal into the complex digital signal.

25. A device as defined in claim 23, wherein said digital filter for converting has a complex L-band filter for conversion of the oversampled real television signal into the complex digital signal, wherein L designates an integer decimation factor.

26. A device as defined in claim 23, wherein said digital filter for band limiting the complex digital signal has a pair of filters having identically designed filter elements for the real part and the imaginary part of the complex digital signal.

27. A device as defined in claim 23, wherein said digital filter for band limiting the complex digital signal has four filter elements for the real part and the imaginary part of the complex coefficients, two of said filter elements being identical, said filter elements being linked to one another on an output side so that one pair of said filters supplies the real part and other pair of said filters supplies the imaginary part of an output signal of a preprocessing stage so as to apply the complex digital signal to a respective pair of said filters.

28. A device as defined in claim 23, wherein said sampling unit has a sampling frequency of substantially 4/5 of a mid frequency of the television signal at intermediate frequency.

29. A device as defined in claim 28, wherein the sampling frequency of said sampling unit is 28.2763 MHz.

30. A device as defined in claim 23, comprising a plurality of said digital filters having filter elements, said digital filters and said filter elements having linear phase transverse filters with symmetrical coefficients selected from the group consisting of recursive filters and non-recursive filters.

31. A device as defined in claim 30, wherein said digital demodulators include a demodulator for the audio elements, said digital demodulator for processing the video elements having an output for extraction of the audio elements and for passing the extracted audio elements to said demodulator for the audio elements.

32. A device as defined in claim 23, wherein said digital demodulators include a digital demodulator for processing of the video elements of the complex digital signal with a mixing frequency selected such that a video sub-carrier appears at a frequency 0 after mixing; and further comprising a complex mixing device connected upstream of said digital demodulator for processing of the video elements of the complex digital signal.

33. A device as defined in claim 31, wherein said digital demodulators include demodulators provided for the separate processing of the audio elements of the complex digital signal and having a complex mixing device connected upstream, said demodulators for the separate processing of the audio elements having mixing frequency selected such that audio sub-carrier frequencies which are offset by the video sub-carrier frequency appear at a frequency 0 after mixing.

34. A device as defined in claim 23, wherein said digital demodulators have a demodulator for the joint processing of the audio elements of the complex digital signal, said demodulator for the joint processing of the audio elements of the complex digital signal having a complex mixing device connected upstream and provided with a mixing frequency which is selected such that an original video sub-carrier frequency which is offset by an arithmetic mean of the audio sub-carrier frequencies appear at a frequency 0 at a signal output of said complex mixing device.

* * * * *